United States Patent
Sittler

(10) Patent No.: US 9,200,932 B2
(45) Date of Patent: Dec. 1, 2015

(54) DIFFERENTIAL PRESSURE TRANSMITTER WITH REDUNDANT SENSORS

(75) Inventor: Fred Charles Sittler, Excelsior, MN (US)

(73) Assignee: Rosemount Inc., Chanhassen, MN (US)

( * ) Notice: Subject to any disclaimer, the term of this patent is extended or adjusted under 35 U.S.C. 154(b) by 480 days.

(21) Appl. No.: 13/482,167

(22) Filed: May 29, 2012

(65) Prior Publication Data

US 2013/0319074 A1 Dec. 5, 2013

(51) Int. Cl.
G01F 1/38 (2006.01)
G01F 25/00 (2006.01)

(52) U.S. Cl.
CPC ............ G01F 1/383 (2013.01); G01F 25/0007 (2013.01)

(58) Field of Classification Search
CPC ...... G01F 1/36–1/38; G01F 1/42; G01F 1/50; G01F 25/00; G01F 25/007; G01F 1/383; G01L 5/06; G01L 5/10
USPC ............... 73/1.35, 1.62, 716, 861.52, 861.61, 73/861.63
See application file for complete search history.

(56) References Cited

U.S. PATENT DOCUMENTS

| | | | |
|---|---|---|---|
| 5,459,675 A * | 10/1995 | Gross et al. | 702/183 |
| 5,591,922 A | 1/1997 | Segeral et al. | |
| 5,886,267 A | 3/1999 | Ortiz | |
| 6,089,097 A | 7/2000 | Frick et al. | |
| 7,261,002 B1 * | 8/2007 | Gysling et al. | 73/861.42 |
| 2006/0112773 A1 * | 6/2006 | Hedtke | 73/861.61 |
| 2007/0038700 A1 | 2/2007 | Eryurek et al. | |
| 2012/0006119 A1 | 1/2012 | Broden | |

FOREIGN PATENT DOCUMENTS

| | | |
|---|---|---|
| CN | 1731105 | 2/2006 |
| JP | 8-107090 | 4/1996 |

OTHER PUBLICATIONS

Notification of Transmittal of the International Search Report and the Written Opinion of the International Searching Authority dated Dec. 11, 2013 for related International Appln. No. PCT/US2013/037096, filed Apr. 18, 2013.
Communication from European Patent Application No. 13719676.2, dated Jan. 16, 2015.

(Continued)

*Primary Examiner* — Daniel S Larkin
*Assistant Examiner* — Irving A Campbell
(74) *Attorney, Agent, or Firm* — Westman, Champlin & Koehler, P.A.

(57) ABSTRACT

A system for measuring flow of process fluid through process piping, includes a flow restriction in the process piping generating a differential pressure between an upstream side of the restriction and a downstream side of the restriction. The differential pressure is related to flow of the process fluid. First and second upstream pressure transmitters are coupled to the process piping on the upstream side of the flow restriction and measure respective first and second upstream pressures. First and second downstream pressure transmitters are coupled to the process piping on the downstream side of the flow restriction and measure respective first and second downstream pressure of the process fluid. Flow rate of the process fluid is calculated based upon at least one upstream pressure and one downstream pressure. Further, degradation in at least one of the pressure transmitters is identified based upon at least two pressure measurements.

25 Claims, 3 Drawing Sheets

(56) References Cited

OTHER PUBLICATIONS

Office Action from Australian Patent Application No. 2013267918, dated Mar. 23, 2015.

Office Action from Chiense Patent Application No. 201210380724.4, dated Jun. 2, 2015.

* cited by examiner

DIFFERENTIAL PRESSURE TRANSMITTER WITH REDUNDANT SENSORS

BACKGROUND

The present invention relates to industrial process control and monitoring systems of the type used to measure and control industrial processes. More specifically, the present invention relates to measurement of flow in industrial processes based upon a differential pressure.

Process variable transmitters are used in industrial processes to measure process variables of various process fluids. Example process variables include pressure, temperature, level or height of process fluid in a tank, flow rate, pH, etc. These measurements can be used to monitor operation of the process, and can be further used as the basis of controlling the process. The transmitters are typically located at a remote location, and transmit the measured processed variable to a centralized location.

One technique used to measure flow in industrial processes is based upon a differential pressure. A restrictive element is placed within the flow, for example a smaller orifice in a process pipe. This creates a differential pressure across the restriction which is related to the flow rate. A differential pressure sensor can be used to measure the differential pressure across the restrictive element. This differential pressure can be correlated with flow rate by the transmitter, or the raw data can be transmitted to a centralized location for processing. In another configuration, rather than using a differential pressure sensor, two individual absolute or gage pressure sensors are used. The two measured pressures can then be subtracted, for example using digital circuitry, to determine the differential pressure.

In a flow measure system which uses two pressure sensors to determine differential pressure, errors may be introduced if one of the pressure sensors fails, or if its accuracy drifts significantly. Such a failure may cause the process to be incorrectly controlled, or may result in incorrect data being collected.

SUMMARY

A system for measuring flow of process fluid through process piping, includes a flow restriction in the process piping generating a differential pressure between an upstream side of the restriction and a downstream side of the restriction. The differential pressure is related to flow of the process fluid. First and second upstream pressure transmitters are coupled to the process piping on the upstream side of the flow restriction and measure respective first and second upstream pressures. First and second downstream pressure transmitters are coupled to the process piping on the downstream side of the flow restriction and measure respective first and second downstream pressure of the process fluid. Flow rate of the process fluid is calculated based upon at least one upstream pressure and one downstream pressure. Further, degradation in at least one of the pressure transmitters is identified based upon at least two pressure measurements.

DETAILED DESCRIPTION OF ILLUSTRATIVE EMBODIMENTS

As discussed in the Background section, differential pressure is a known technique for measuring flow of a process fluid. This differential pressure can be measured using a single sensor which is configured to measure a differential pressure, or can be measured by using two pressure sensors. When using two sensors, the pressure difference between the two sensors is calculated or otherwise measured and used to correlate to flow. In some environments, the sensors are exposed to particularly harsh conditions, such as high pressure or temperature extremes. Further, these pressure sensors may be at remote locations which are difficult to monitor or otherwise service. For example, measuring the flow of oil in an undersea location may be difficult and require the pressure sensor to be capable of handling extreme line pressures, for example 20 Kpsi. In such a configuration, two line pressure sensors may be a preferable technique for measuring the differential pressure. Line pressure sensors can be configured to operate at high pressure while also providing more information than a single differential pressure sensor. One pressure sensor that is particularly well-suited for operating at such high pressure is illustrated in U.S. Pat. No. 6,089,097 entitled ELONGATED PRESSURE SENSOR FOR A PRESSURE TRANSMITTER assigned to Rosemount Inc.

The present invention provides a method and apparatus for measuring differential pressure while also providing diagnostic information which can be used to identify a failing sensor. For example, if one of the pressure sensors fail, or returns an inaccurate reading, the flow calculation will be inaccurate. Limited diagnostics can be accomplished by comparing the individual levels of the sensor outputs or by observing excessively large differential pressure. However, this provides no information regarding which of the sensors is failing. The present invention provides a technique for verifying the integrity of measurements and isolating a defective sensor.

With the present invention, four absolute gage pressure transmitters are used and arranged in a redundant configuration. Two of the transmitters are located on the high pressure side upstream of the flow restriction and two of the transmitters are located on the low pressure side downstream of the flow restriction.

Figure 1:
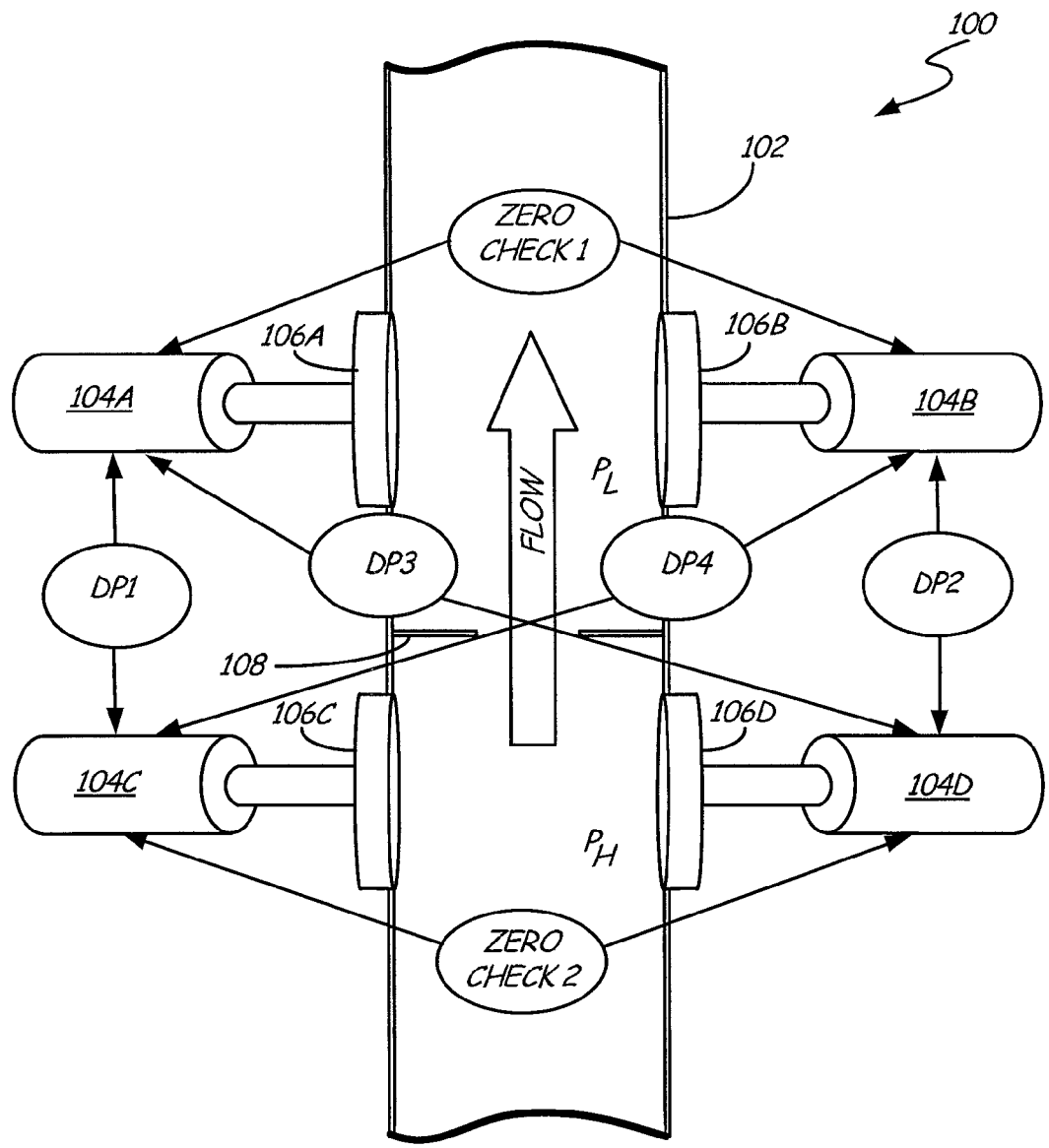
FIG. 1 is a simplified block diagram of a system for measuring flow based upon differential pressure.

FIG. 1 is a simplified diagram of an industrial process, control or monitoring system 100 configured to monitor a flow of a process fluid through process piping 102. A restriction (restrictive element) 108 is placed in the flow. This can comprise, for example, a venturi tube, a flow nozzle, an orifice plate, etc. As the flow moves through the restriction 108, a pressure differential is created with a high pressure $P_H$ on the upstream side of the restriction and a low pressure $P_L$ on the low pressure side of the restriction 108. In the configuration of FIG. 1, four absolute pressure sensors are arranged to measure four pressures. A low pressure transmitter 104A includes a low pressure sensor 106A configured to measure a first low pressure PLA. A second, redundant low pressure transmitter 104B includes a pressure sensor 106B arranged to measure a second low pressure PLB. Similarly, a first high pressure transmitter 104C includes a first high pressure sensor 106C arranged to measure a first high pressure piece of PHC. A redundant high pressure transmitter 104D including a high pressure sensor 106D is arranged to measure a second high pressure piece of PHD. As illustrated in FIG. 1, this allows measurement of four different differential pressures. DP1 as between sensors 106C and 106A, DP2 as between sensors 106D and 106B, DP3 as between 106D and 104A, and DP4 as between 106C and 106B.

The pressure transmitters 104A-D can be connected to a separate microprocessor which is capable of executing power series mathematics. If the two transmitters on the high side (104C and 104D) and the two transmitters on the low side (104A and 104B) are characterized for differential pressure, they will provide an indication of the quality of the differential pressure measurement. More specifically, the variations between the four different differential pressure measurements can be used to give an indication of the quality or accuracy of the differential pressure measurement. In an ideal situation, the differential pressures DP1 and DP2 should always be the same. However, any drift in any of the four sensors (106A-D) will result in a difference between these two differential pressures. The size of the difference between the two differential pressure measurements DP1 and DP2 provides an indication of the error that may be expected in the differential pressure measurement. Thus, this difference provides an indication of the quality of the measurements being obtained. Similarly, such a quality indication can be obtained by observing the difference between pressures PLA and PLB measured by sensors 106A and 106B, respectively, as well as pressure PHC and PHD measured by sensors 106C and 106D, respectively. Further, zero checks can be performed between pairs of upstream and downstream sensors. Specifically, the differences between outputs of transmitters 104A and 104B should be zero as should the difference between the outputs from transmitters 104C and 104D.

Figure 2:
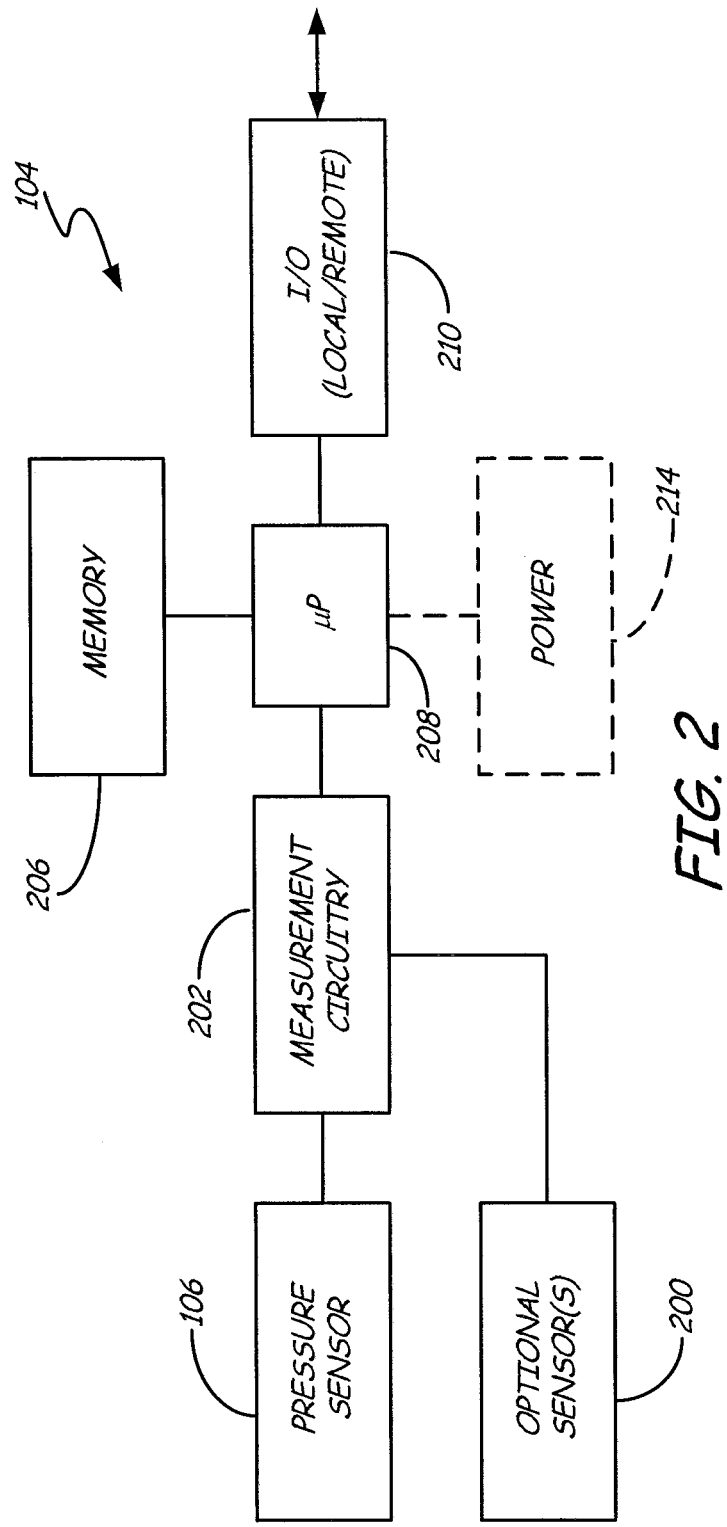
FIG. 2 is a simplified block diagram of a pressure transmitter of FIG. 1.

FIG. 2 is a simplified diagram of an absolute pressure transmitter 104. As discussed above, the transmitter 104 includes an absolute pressure sensor 106. Additional, optional sensors 200 may also be provided. These may include additional pressure sensors including differential pressure sensors, absolute pressure sensors, temperature sensors, or other types of sensors. Measurement circuitry 202 is configured to receive the output from the pressure sensor and provide an output to microprocessor 208 related to the sensed pressure. For example the measurement circuitry may amplify the signal from the sensor, convert the signal into a digital signal, compensate the pressure measurement, etc. The microprocessor 208 operates in accordance with instructions stored in a memory 206 and is configured to communicate using input/output circuitry 210. This input/output circuitry may be configured for local communication, for example to another transmitter 104, and/or may be configured to communicate to a remote location. The communication occurs over a communication link 212 which may be wired, wireless, or a combination thereof. Example wired communication techniques include two-wire process control loops such as those that operate in accordance with the HART® communication standard. Wireless techniques, such as the HART® communication protocol in accordance with the IEC 62591 Standard may also be used. The transmitter 104 may optionally include an internal power source 214 for powering the device. This may be a battery, a generator unit such as a solar generator, heat based generator, mechanical based generator, etc. In another configuration, power is provided from an external source, which may include, for example, receiving power through communication link 212. In these configurations, the microprocessor 208 provides a controller in accordance with the invention and can be configured to calculate flow of the process fluid based upon at least one upstream pressure and at least one downstream pressure. The microprocessor can be further configured to identify a degradation in at least one of the pressure transmitters 104A-D based upon at least two separate pressure measurements. It is further appreciated that the microprocessor can use the measurements from all four pressure sensors to calculate and compare four separate different pressures (see FIG. 1) to identify a degradation in at least one of the pressure sensors.

In one configuration, the microprocessor 208 is capable of calculating the differential pressures and performing the diagnostics as discussed above. In another example configuration, the any number of the individual transmitters 104A-D only include basic circuitry configured for transmitting the sensed pressure. The actual differential pressure determinations and/or diagnostics are performed by a separate device. In such a configuration, the circuitry shown in FIG. 2 can comprise such a remote differential pressure/diagnostic system. In this configuration, the pressure sensor 106 and measurement circuitry 202 may not necessarily be required. Instead, the individual pressure signals are retrieved from the various pressure transmitters over communication link 212 through the input/output circuitry 210.

Figure 3:
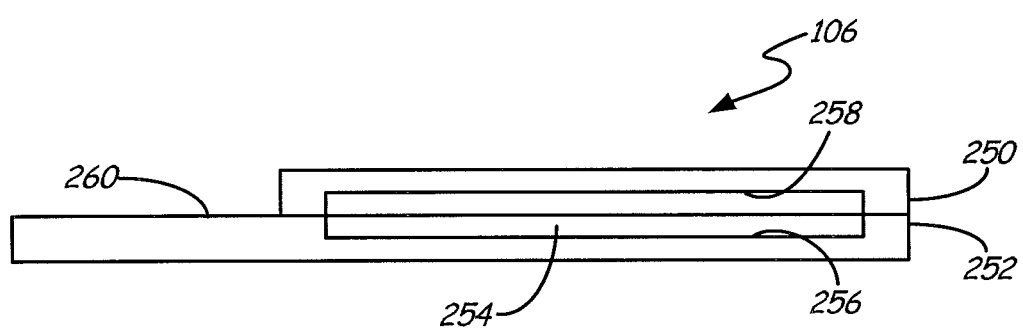
FIG. 3 is a side cross-sectional view of a pressure sensor of the transmitter of FIG. 2.

The individual pressure sensors 106 may be in accordance with any technology. In one preferred configuration, the pressure sensors 106 are formed of a brittle material such as sapphire. For example, FIG. 3 shows a configuration of a pressure sensor 106 formed of a brittle material including two sensor halves 250, 252. A cavity 254 is formed between the two halves 250, 252. As pressure is applied to the sensor 106, the size of the cavity 254 deforms slightly. This deformation can be sensed using various sensing technologies. In one example configuration, capacitive plates 256 and 258 are carried in the cavity 254. The capacitance between the plates 256, 258 is indicative to the deformation of the cavity 254 and therefore may be correlated with the applied pressure. Electrical connectors 260 are provided for coupling to plates 256, 258. Such a sensor is shown and described in U.S. Pat. No. 6,089,097 entitled ELONGATED PRESSURE SENSOR FOR A PRESSURE TRANSMITTER.

Although the present invention has been described with reference to preferred embodiments, workers skilled in the art will recognize that changes may be made in form and detail without departing from the spirit and scope of the invention. In one example, noise signals which are similar between more than one sensor can be used to perform diagnostics on other components in the process as well as the on the device itself.

What is claimed is:

1. A system for measuring flow of process fluid through process piping, comprising:

a flow restriction in the process piping generating a differential pressure in the process fluid between an upstream side of the restriction and a downstream side of the flow restriction, the differential pressure flow related to flow of the process fluid;

first and second upstream pressure transmitters each coupled to the process piping on the upstream side of the flow restriction, the first and second upstream transmitters having respective first and second upstream pressure sensors and measurement circuitry measuring first and second upstream pressures of the process fluid, respectively, and responsively transmitting first and second upstream transmitter outputs related to the measured first and second upstream pressures;

first and second downstream pressure transmitters each coupled to the process piping on the downstream side of the flow restriction, the first and second downstream pressure transmitters having respective first and second downstream pressure sensors and measurement circuitry measuring first and second downstream pressures of the process fluid and responsively transmitting first and second downstream transmitter outputs related to the measured first and second downstream pressures; and a controller configured to calculate flow of the process fluid based upon a pressure difference between at least one upstream pressure and one downstream pressure and further configured to identify a degradation in at least one of the pressure transmitters based upon at least two pressure measurements.

2. The system of claim 1 wherein the at least two pressure measurements includes the first upstream pressure and the first downstream pressure.

3. The system of claim 1 wherein the at least two pressure measurements includes the first upstream pressure and the second downstream pressure.

4. The system of claim 1 wherein the at least two pressure measurements includes the first downstream pressure and the second upstream pressure.

5. The system of claim 1 wherein the at least two pressure measurements includes the second upstream pressure and second downstream pressure.

6. The system of claim 1 wherein the controller compares the differential pressures calculated using the first and second upstream transmitters and first and second downstream transmitters to identify degradation in at least one of the transmitters.

7. The system of claim 1 wherein the pressure transmitters each include communication circuitry configured to communicate respective measured pressures to the controller.

8. The system of claim 7 wherein the controller is located within at least one of the pressure transmitters.

9. The system of claim 7 wherein the controller is located at a remote location.

10. The system of claim 7 wherein the communication circuitry is configured for wireless communication.

11. The system of claim 7 wherein the communication circuitry is configured for wired communication.

12. The system of claim 7 wherein power for the pressure transmitters is provided by the communication circuitry.

13. The system of claim 1 wherein the controller is configured to perform a zero check between the measured first upstream pressure and the measured second upstream pressure.

14. The system of claim 1 wherein the controller is configured to perform a zero check between the measured first downstream pressure and the measured second downstream pressure.

15. The system of claim 1 wherein the pressure sensors are configured to be directly exposed to the process fluid.

16. The system of claim 1 wherein the pressure sensors are formed of a brittle material having a cavity formed therein, wherein the cavity is responsive to applied pressure.

17. The system of claim 1 wherein at least one of the pressure transmitters includes an optional sensor.

18. The system of claim 17 wherein the optional sensor comprises a temperature sensor.

19. A method for measuring flow of process fluid through process piping, comprising:

providing a flow restriction in the process piping generating a differential pressure in the process fluid between an upstream side of the flow restriction and a downstream side of the flow restriction, the differential pressure related to flow of the process fluid;

measuring a first and second upstream pressures of a process fluid using first and second upstream pressure transmitters each coupled to the process piping on the upstream side of the flow restriction, the first and second upstream pressure transmitters, having respective first and second upstream pressure sensors and measurement circuitry measuring a first and second upstream pressure of the process fluid, respectively, and responsively transmits a first upstream transmitter output related to the measured first and second upstream pressure;

measuring first and second downstream pressures of a process fluid using first and second downstream pressure transmitters each coupled to the process piping on the downstream side of the flow restriction, the first and second downstream pressure transmitters having respective first and second downstream pressure sensors and measurement circuitry measuring first and second downstream pressures of the process fluid, and responsively transmitting first and second downstream transmitter outputs related to the measured first and second downstream pressure; and calculating flow of the process fluid based upon a difference between at least one upstream pressure and one downstream pressure and further identifying a degradation in at least one of the pressure transmitters based upon at least two pressure measurements.

20. The method of claim 19 wherein the at least two pressure measurements includes the first upstream pressure and the first downstream pressure.

21. The method of claim 19 wherein the at least two pressure measurements includes the first upstream pressure and the second upstream pressure.

22. The method of claim 19 wherein the at least two pressure measurements includes the first downstream pressure and the second downstream pressure.

23. The method of claim 19 including performing a zero check between the measured first upstream pressure and the measured second upstream pressure.

24. The method of claim 19 including performing a zero check between the measured first downstream pressure and the measured second downstream pressure.

25. A system for measuring flow of process fluid through process piping, comprising:

a flow restriction in the process piping generating a differential pressure in the process fluid between an upstream side of the flow restriction and a downstream side of the flow restriction, the differential pressure related to flow of the process fluid;

first and second upstream pressure sensors each coupled to the process piping on the upstream side of the flow restriction, the first and second upstream sensors at a first radial position along the process piping, respectively, measuring first and second upstream pressures of the process fluid and responsively outputting first and second upstream sensor outputs related to the measured first and second upstream pressures;

first and second downstream pressure sensors each coupled to the process piping on the downstream side of the flow restriction, the first and second downstream pressure sensors of a second radial position along the process piping, respectively, measuring first and second downstream pressures of the process fluid and responsively outputting first and second downstream sensor outputs related to the measured first and second downstream pressures; and a controller configured to calculate flow of the process fluid based upon a difference between at least one upstream pressure and one downstream pressure and further configured to identify a degradation in at least one of the pressure sensors based upon at least two pressure measurements.

* * * * *